Nov. 1, 1927.

A. CAMPORINI 1,647,271

SHOCK ABSORBER

Filed Sept. 24, 1925

Inventor
Augustine Camporini

Nov. 1, 1927.
A. CAMPORINI
1,647,271
SHOCK ABSORBER
Filed Sept. 24, 1925      2 Sheets-Sheet 2
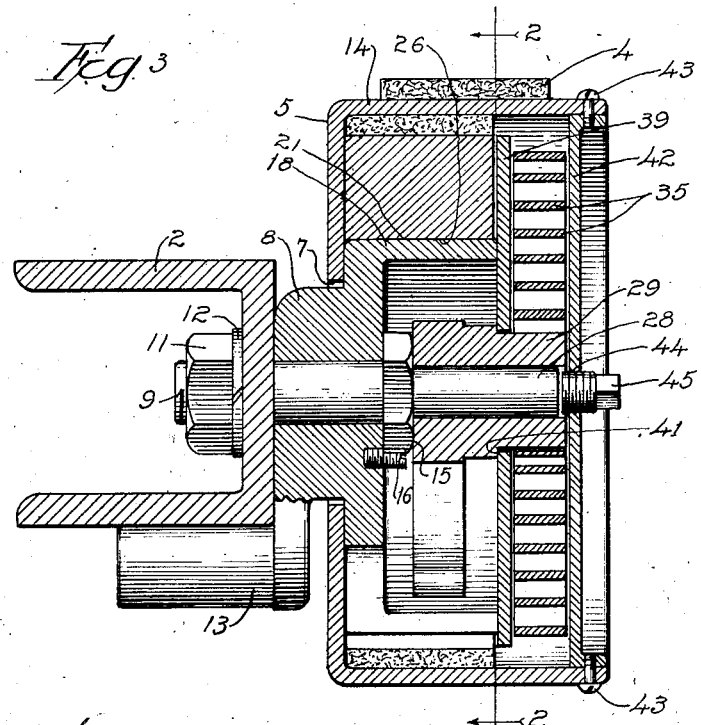
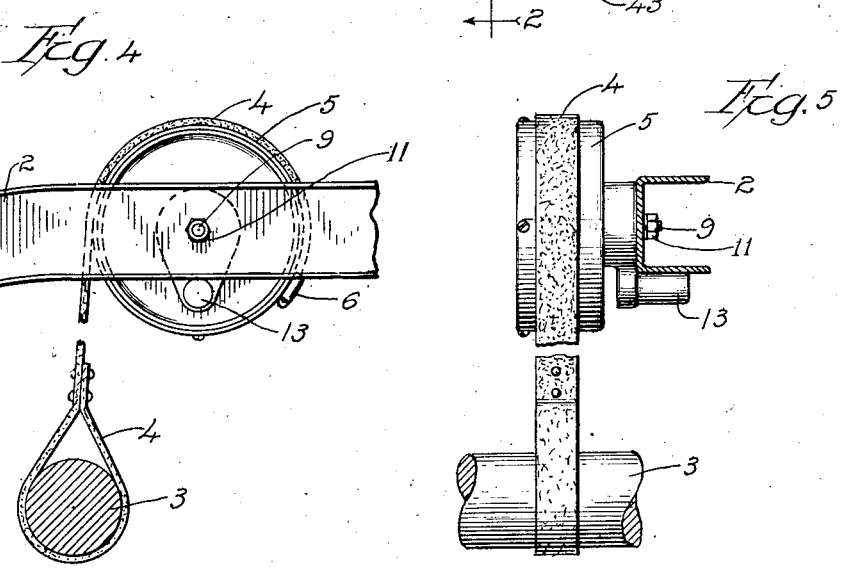
Inventor:
AUGUSTINE CAMPORINI Patented Nov. 1, 1927.

1,647,271

UNITED STATES PATENT OFFICE.

AUGUSTINE CAMPORINI, OF CHICAGO, ILLINOIS.

SHOCK ABSORBER.

Application filed September 24, 1925. Serial No. 58,233.

The invention relates to vehicle shock absorbers and the like and more particularly to a shock absorber of the flexible strap or cable type wherein a friction element cooperative with a drum is fixed to one of two relatively movable portions of a vehicle or the like and a flexible strap or cable suitably attached to the drum is secured to the other of said relatively movable portions of the vehicle or the like.

One of the primary objects of the invention is to provide a shock absorber having a minimum number of operating parts and which is therefore simple in construction, one which will perform the necessary function of permitting the vehicle spring to be readily compressed when the wheel of the vehicle meets with an obstruction in the road-way and which will become immediately effective upon restorative movement of the spring to normal position to effectively snub or check the rebound action.

Another object is to provide a shock absorber of such construction that wear on the operating parts thereof will be reduced to a minimum and any worn parts may be readily replaced. In this connection, I obviate the necessity for any bushings or other costly parts which frequently and quickly wear out and are a continual source of trouble.

Further objects include the provision of a shock absorber which shall be simple in construction, economical to manufacture, easy to assemble and strong and durable in use.

Still further objects should become apparent after reading the description and claims and after viewing the drawings in which:

Fig. 3 is a sectional view taken on the line 3—3 of Fig. 2 and

Figs. 4 and 5 are general plan and side elevational views of a shock absorber constructed in accordance with the invention as it would be applied to a vehicle.

The vehicle frame is generally indicated at 2 and forms one of the two relatively movable portions of the vehicle between which the operative portions of the shock absorber are connected, the other being herein indicated as the vehicle axle 3 about which a flexible strap or cable 4 is connected and arranged about the drum member generally indicated by 5 for relatively fixed connection therewith in any suitable manner at 6.

Figure 1:
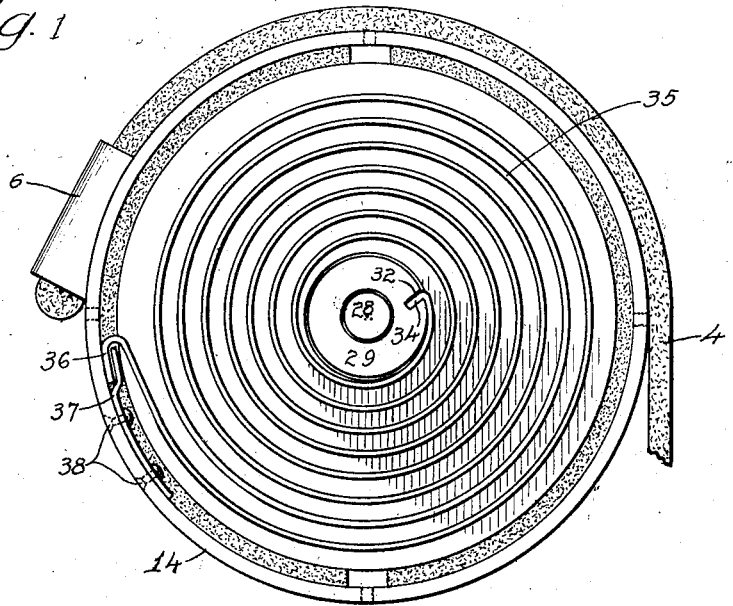
Fig. 1 is a front elevation of a preferred form of the invention with the cover plate removed.
Figure 2:
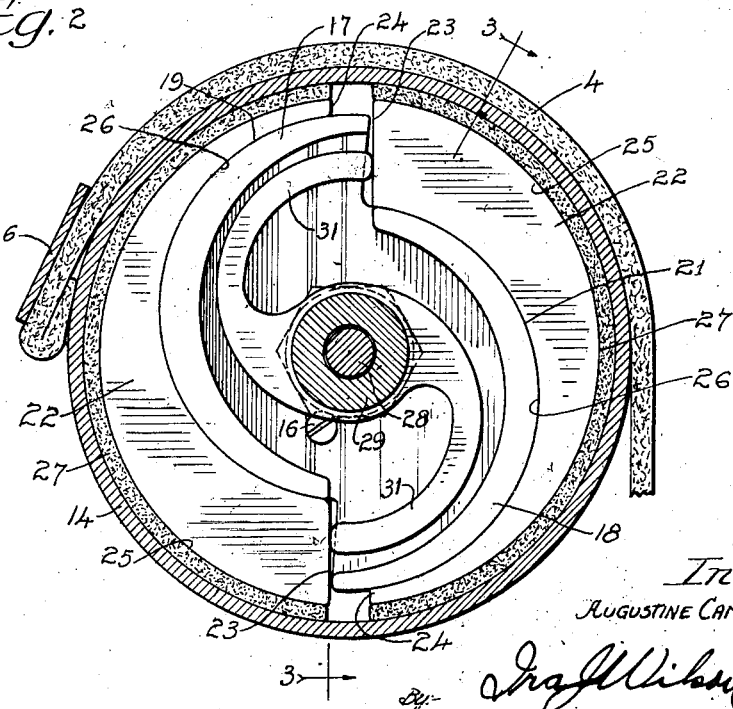
Fig. 2 is a view similar to that of Fig. 1, taken on the line 2—2 of Fig. 3.

The drum is preferably a cup-shaped member, the bottom of which is provided with an opening 7 to receive a member 8 tightly secured through the intermediary of a bolt 9, nut 11 and lock washer 12 and a lug 13 integral with the hub, to the frame of the body of the vehicle. The drum is also provided with a flanged portion 14, the interior face of which provides a friction or braking surface during movements of the drum in a clockwise direction, viewing Figs. 1 and 2.

The hub 8 is rigidly secured to the frame of the machine by the nut 11 and lock washer 12 cooperating with a boss nut or the like 15 formed integral with or securely attached to the bolt 9 on the inner side of the hub. If the member 15 be a nut as shown in Fig. 3 and it be engaged with the bolt by means of threads, I prefer to lock the nut in position thereon by means of a set screw 16 or in any other desirable manner.

The hub 8 is preferably provided with two arms or integral projections 17 and 18 which are of generally crescent-shape, arranged eccentrically to the axis of the bolt and drum which are concentric one with the other. The outer surfaces of these members indicated at 19 and 21 respectively, may be of any preferred radius of curvature or they may be portions of any irregular curve, provided such curve will serve the function for which the members 17 and 18 are designed. Between the eccentric projections 17 and 18 of the hub or the eccentric members, as I shall term them, and the interior braking surface of the flange 14 of the drum, are a pair of brake shoes 22, substantially identical in shape and construction. Each shoe preferably has a wide base 23 and gradually tapers down to a relatively thin edge 24 at its opposite end. The outer surfaces 25 are preferably concentric with the axis of the drum and, therefore, with the braking surface thereof, but their inner surfaces 26, i. e. those surfaces opposite the surfaces 25, are preferably of the same shape and contour as the surfaces 19 and 21 of the eccentric members 17 and 18 respectively. Preferably secured to these wedge members 22 on their outer concentric surfaces, are strips of frictional material 27 of any desired character for frictional engagement with the interior or braking surface of the drum.

The bolt 9 is reduced at its inner end 28 and forms a bearing surface for the hub 29 of an S-shaped lever having arms 31 adapted to abut against the broad ends of the brake shoes. The hub 29 of this lever is slotted as at 32 to receive the bent end 34 of a relatively heavy flat spiral spring 35. The other end 36 of this spring, after being coiled in a clockwise direction, engages behind a lug 37 secured by rivets 38 or in any other suitable manner to the flange 14 of the drum. I prefer to place a thin metal plate 39 against a shoulder 41 formed on the hub 29 and against the ends of the eccentric members and the brake shoes to position the spring properly for operation. Preferably also, a circular and flanged cover plate or cap 42 is secured closely adjacent the spring 35 within the end of the flanged drum by means of screws or the like 43 passing through the flange of the drum into the flange of the cap.

In operation, assuming from Figs. 4 and 5, that the vehicle has met an obstruction in the roadway which has caused the vehicle spring to be compressed permitting the frame 2 to which the drum of the shock absorber is attached, to relatively approach the axle 3 to which the strap of the shock absorber is attached, the drum 5 will rotate in a counter-clockwise direction under influence of the spring 35. This action will wind the flexible strap or cable 4 about the outer circumference of the flange 14 until relative movement of the two parts of the vehicle toward one another has ceased. During this movement, the tendency of the drum will be to urge the shoes 22 and thereby the S-shaped lever ends 31 in a counter-clockwise direction and as the tension of the spring 35 is reduced by winding up a strap, the frictional resistance of the shoes to the rotation of the drum will be correspondingly reduced, but as only sufficient tension to take up all the slack of the strap 4 is initially placed upon the spring and as the parts of the device including the eccentric surfaces 21 and 26 are properly proportioned and shaped, the frictional resistance to movement of the drum in a counter-clockwise direction and the resistance to the action of the spring in taking up the slack of the strap is slight and for all practical purposes, negligible. In other words, while the shoes offer some resistance to rotation of the drum in a counter-clockwise direction nevertheless, this resistance is constantly decreased as the tension of the spring becomes less and as the drum tends to urge the shoes away from itself by frictional engagement therewith. Immediately upon cessation of movement of the two relatively movable portions of the vehicle toward one another, the vehicle spring begins its rebound action, and at this instant, tension is placed upon the strap or cable 4 tending to rotate the drum 5 in a clockwise direction. Any movement of the drum in a clockwise direction will tend to coil the spring 35 and wind it up, but this winding action will tend to turn the hub 29 also in a clockwise direction pressing the arms 31 of the S-shaped lever against their abutments, the broad faces of the brake shoes. The brake shoes 23 will then be urged outwardly into tight frictional contact with the interior braking surface of the flange 14 of the drum by means of the co-action of the eccentric members 17 and 18 and the tendency of frictional engagement between the friction material 27 and the braking surface of the drum. In other words, the greater the movement of the drum in a clockwise direction, the greater will be the frictional resistance offered to its return motion in this direction.

The shock absorber herein illustrated and described has been designed to be internally filled with heavy grease and for the purpose of filling the casing with grease, an opening 44 adapted to be closed by a plug 45, is provided. If desired, a connection for any of the standard pressure greasing devices may be substituted for the plug 45.

The foregoing description should be understood to be a preferred form of the invention for obviously many changes may be made without departing from the spirit of the invention or the scope of the appended claims.

I claim:

1. In combination with a frame of a vehicle and a part of the vehicle movable relatively thereto, means for snubbing their relative movement comprising a fixed member, a member rotatable with movement of the said vehicle part, a wedge shaped element frictionally engageable between said fixed and rotatable members, and means connected to said rotatable member and responsive to predetermined rotary movements of said rotatable member for positively urging said wedge element into engagement with said rotary member.

2. A vehicle snubber comprising a member carried by the vehicle frame, a member rotatably responsive at all times with movements of the vehicle axle, a wedge shaped member directly engaging said members for offering resistance to their relative movement, and means connected to said rotatable member and responsive to predetermined rotary movements of said rotatable member for positively urging said wedge member between the first and second said members.

3. A shock absorber comprising, a rotary drum providing an interior braking surface, a pair of wedge-shaped friction shoes adapted to frictionally engage said surface, a stationary member cooperative with said shoes for guiding said shoes into and out of engagement with said surface and means including means bearing on the broad ends of the shoes for urging the shoes into frictional contact with said surface upon rotary movement of said drum in one direction.

4. A shock absorber comprising, a rotary drum providing a braking surface on the interior circumferential rim thereof, a pair of friction shoes adapted to engage said surface, means within and relatively stationary to said drum providing surfaces cooperative with the interior surfaces of said shoes and eccentric to the braking surface of the drum, and means for urging said shoes along said eccentric surfaces into braking engagement with the braking surface of the drum upon predetermined movements of the drum.

5. A shock absorber comprising, a rotary drum providing a braking surface on the interior circumferential rim thereof, a pair of friction shoes adapted to engage said surface, means within and relatively stationary to said drum providing surfaces cooperative with the interior surfaces of said shoes and eccentric to the braking surface of the drum, and means in connection with said drum for urging said shoes along said eccentric surfaces into braking engagement with said braking surface upon predetermined rotative movements of said drum.

6. A shock absorber comprising, a rotary drum providing a braking surface on the interior circumferential rim thereof, a pair of friction shoes each having a surface concentric with said braking surface and adapted to be frictionally engaged therewith, each shoe having an eccentric surface opposed to said concentric surface, means within said drum and relatively stationary thereto having surfaces cooperative with the eccentric surfaces of said shoes whereby upon predetermined movements of said shoes the shoes will frictionally engage said braking surface, and means responsive to predetermined movements of said drum for obtaining said predetermined movements of said shoes.

7. A shock absorber comprising, a rotary cup-shaped drum providing a braking surface on the interior circumferential rim thereof, a friction shoe having a surface concentric with said braking surface and adapted to be frictionally engaged therewith, said shoe having an eccentric surface opposed to said concentric surface, means within said drum and relatively stationary with respect thereto providing a surface cooperative with the eccentric surface of said shoe whereby upon predetermined movements of said shoe the shoe may be frictionally engaged with said braking surface, and means connected to said drum and responsive to predetermined movements of said drum for moving said shoe through said predetermined movements.

8. A shock absorber comprising, a rotary drum, a braking surface on the interior circumference of the rim of the drum, wedge-shaped braking means adapted to be moved into braking engagement with said braking surface means for directing said braking means into engagement with said braking surface, and means connected to said drum for urging said braking means into engagement with said braking surface, upon predetermined rotary movements of said drum.

9. A shock absorber comprising, a rotary drum, a braking surface on the interior circumference of the rim of the drum, wedge shaped braking means adapted to be moved into braking engagement with said braking surface, means for directing said braking means into engagement with said braking surface, and means connected to said rotary drum for resiliently urging said braking means into engagement with said braking surface, upon predetermined rotary movements of said drum.

10. A shock absorber comprising, a rotatable drum providing a circular braking surface, a brake shoe adapted to be positively engaged with said braking surface upon movement of said drum in one direction and to be urged away from said braking surface by action of said drum upon movement of the drum in the opposite direction, means for directing said brake shoe into and out of braking engagement with said braking surface during respectively opposite movements of said drum, means connected to said drum for positively urging said brake shoe into engagement with said braking surface upon movement of said drum in the first said direction, and means for moving the drum in the first said direction.

11. A shock absorber comprising, a rotatable drum providing a circular braking surface, a brake shoe adapted to be positively engaged with said braking surface upon movement of said drum in one direction and to be urged away from said braking surface by action of said drum upon movement of the drum in the opposite direction, means for directing said brake shoe into and out of braking engagement with said braking surface during respectively opposite movements of said drum, means connected to said drum for urging said brake shoe into engagement with said braking surface upon movement of said drum in the first said direction, and means for rotating the drum in both directions.

12. A shock absorber comprising, a rotatable drum providing a circular braking surface, a brake shoe adapted to be positively engaged with said braking surface upon movement of said drum in one direction and to be urged away from said braking surface by action of said drum upon movement of the drum in the opposite direction, means for directing said brake shoe into and out of braking engagement with said braking surface during respectively opposite movements of said drum, means including a resilient member connected with said drum for urging said brake shoe into engagement with said braking surface upon movement of said drum in the first said direction, and means for moving the drum in the first said direction.

13. A shock absorber comprising, a rotatable drum providing a circular braking surface, a brake shoe adapted to be positively engaged with said braking surface upon movement of said drum in one direction and to be urged away from said braking surface by action of said drum upon movement of the drum in the opposite direction, means for directing said brake shoe into and out of braking engagement with said braking surface during respectively opposite movements of said drum, means including a resilient member connected with said drum for urging said brake shoe into engagement with said braking surface upon movement of said drum in the first said direction, and means for rotating the drum in both directions.

14. A shock absorber comprising, a drum having a circumferential flange providing an internal braking surface, a hub adapted to be fixedly secured to one of two relatively movable portions of a vehicle and upon which hub said drum is mounted for rotation in opposite directions, a friction shoe having a surface concentric with said braking surface and adapted to be frictionally engaged therewith, said shoe having an eccentric surface opposed to said concentric surface, means connected with said hub and relatively stationary thereto having an eccentric surface cooperative with the eccentric surface of said shoe whereby said shoe upon predetermined movements will engage said breaking surface, means mounted on and movable about said hub and responsive to predetermined rotary movements of said drum to cause predetermined movements of said shoe, and means engaged with said drum and the other of said relatively movable portions of the vehicle for rotating the drum upon predetermined relative movements of said portions.

15. A shock absorber comprising, a drum having a circumferential flange providing an internal braking surface, a hub adapted to be fixedly secured to one of two relatively movable portions of a vehicle and upon which hub said drum is mounted for rotation in opposite directions, a friction shoe having a surface concentric with said braking surface and adapted to be frictionally engaged therewith, said shoe having an eccentric surface opposed to said concentric surface, means connected with said hub and relatively stationary thereto having an eccentric surface cooperative with the eccentric surface of said shoe whereby said shoe upon predetermined movements will engage said braking surface, means mounted on said hub for limited rotational movement and responsive to predetermined rotary movements of said drum to move said shoe into frictional engagement with said braking surface, including means connecting the drum and said limitedly rotational means, and means engaged with said drum and the other of said relatively movable portions of the vehicle for rotating the drum upon predetermined relative movements of said portions.

16. A shock absorber comprising, a drum having a circumferential flange providing an internal braking surface, a hub adapted to be fixedly secured to one of two relatively movable portions of a vehicle and upon which hub said drum is mounted for rotation in opposite directions, a friction shoe having a surface concentric with said braking surface and adapted to be frictionally engaged therewith, said shoe having an eccentric surface opposed to said concentric surface, means connected with said hub and relatively stationary thereto having an eccentric surface cooperative with the eccentric surface of said shoe whereby said shoe upon predetermined movements will engage said braking surface, means mounted on said hub for limited rotational movement and responsive to predetermined rotary movements of said drum to move said shoe into frictional engagement with said braking surface, including a flat helix spring connecting the drum and said limitedly rotational means, and means engaged with said drum and the other of said relatively movable portions of the vehicle for rotating the drum upon predetermined relative movements of said portions.

17. A shock absorber comprising, a rotary drum having a braking surface, a stationary hub forming a bearing for said drum and having a portion interior of the drum providing a surface eccentric to said braking surface and spaced therefrom throughout its length, a wedge-shaped shoe mounted on and freely movable along said eccentric surface for movements into and out of frictional engagement with said braking surface, and means engaging the butt end of said wedge-shaped shoe for urging the shoe into engagement with said braking surface.

In witness of the foregoing I affix my signature.

AUGUSTINE CAMPORINI.